United States Patent
Brachert et al.

(10) Patent No.: US 7,293,544 B2
(45) Date of Patent: Nov. 13, 2007

(54) METHOD FOR OPERATING AN INTERNAL COMBUSTION ENGINE

(75) Inventors: Goetz Brachert, Stuttgart (DE); Ruediger Herweg, Esslingen (DE); Kai Kanning, Stuttgart (DE); Matthias Pfau, Ludwigsburg (DE); Jochen Schaeflein, Stuttgart (DE); Hans Juergen Weimann, Oppenweiler (DE)

(73) Assignee: DaimlerChrysler A.G., Stuttgart (DE)

( * ) Notice: Subject to any disclaimer, the term of this patent is extended or adjusted under 35 U.S.C. 154(b) by 0 days.

(21) Appl. No.: 10/577,763

(22) PCT Filed: Oct. 13, 2004

(86) PCT No.: PCT/EP2004/011453

§ 371 (c)(1),
(2), (4) Date: Dec. 29, 2006

(87) PCT Pub. No.: WO2005/047666

PCT Pub. Date: May 26, 2005

(65) Prior Publication Data

US 2007/0209633 A1    Sep. 13, 2007

(30) Foreign Application Priority Data

Oct. 29, 2003  (DE) .................................. 103 50 800

(51) Int. Cl.
  *F02B 3/10*    (2006.01)

(52) U.S. Cl. .................................. 123/299; 123/568.14
(58) Field of Classification Search ................ 123/294, 123/299, 568.14
See application file for complete search history.

(56) References Cited

U.S. PATENT DOCUMENTS 6,609,493 B2 * 8/2003 Yamaguchi et al. ......... 123/299

(Continued)

FOREIGN PATENT DOCUMENTS

DE    195 19 663 A1    5/1996

(Continued)

OTHER PUBLICATIONS

International Search Report dated Jan. 7, 2005 including English translation of relevant portion (Five (5) pages).

*Primary Examiner*—Erick Solis
(74) *Attorney, Agent, or Firm*—Crowell & Moring LLP

(57) ABSTRACT

A method retains exhaust gas in the combustion chamber of an internal combustion engine and compresses the exhaust gas during a charge change. A first fuel quantity is injected into the retained exhaust gas by direct fuel injection. A second fuel quantity is subsequently fed to the combustion chamber so that a homogeneous fuel/air mixture is obtained in the combustion chamber. An auto-ignition time of the fuel/air mixture which is formed from the first and second fuel quantities is set as a function of a quantity ratio of the first fuel quantity to the second fuel quantity.

14 Claims, 1 Drawing Sheet

U.S. PATENT DOCUMENTS

| | | |
|---|---|---|
| 6,964,256 B2 * | 11/2005 | Kataoka et al. ............. 123/295 |
| 7,222,602 B2 * | 5/2007 | Fukasawa ................... 123/299 |
| 7,234,438 B2 * | 6/2007 | Yang .......................... 123/295 |
| 7,240,659 B2 * | 7/2007 | Yang .......................... 123/295 |
| 2001/0015192 A1 | 8/2001 | Urushihara et al. |
| 2002/0007816 A1 | 1/2002 | Zur Loye et al. |
| 2002/0017269 A1 | 2/2002 | zur Loye et al. |
| 2002/0020388 A1 | 2/2002 | Wright et al. |
| 2002/0040692 A1 | 4/2002 | LaPointe at al. |
| 2003/0168037 A1 | 9/2003 | zur Loye et al. |
| 2003/0230276 A1 * | 12/2003 | Kataoka et al. ............. 123/295 |
| 2004/0016416 A1 | 1/2004 | Walter et al. |
| 2004/0149255 A1 | 8/2004 | zur Loye et al. |
| 2004/0154582 A1 * | 8/2004 | Shimazaki .................. 123/299 |

FOREIGN PATENT DOCUMENTS

| | | |
|---|---|---|
| DE | 198 10 935 C2 | 9/1999 |
| EP | 0 990 788 A2 | 4/2000 |
| EP | 1 279 802 A1 | 1/2003 |
| GB | 2 277 776 A | 11/1994 |

* cited by examiner

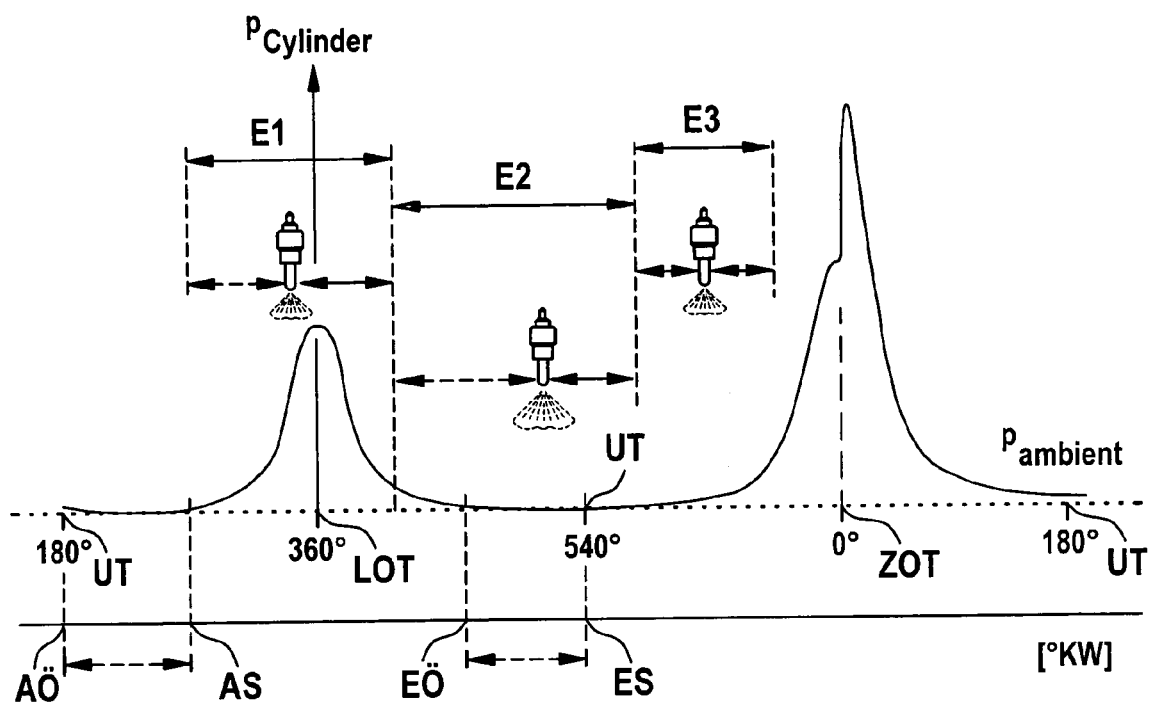

METHOD FOR OPERATING AN INTERNAL COMBUSTION ENGINE

BACKGROUND AND SUMMARY OF THE INVENTION

This application is a National Phase of PCT/EP2004/011453, filed Oct. 13, 2004 and claims priority of German patent document DE 103 50 800.7, filed Oct. 29, 2003.

The present invention relates to a method for operating an internal combustion engine, in particular an auto-ignition internal combustion engine with direct injection.

In direct-injection internal combustion engines with auto-ignition, lean homogeneous fuel/air mixtures are often made to auto-ignite so that high efficiency levels and improved exhaust emissions are obtained. In such internal combustion engines which are referred to as HCCI or PCCI internal combustion engines, also referred to as internal combustion engines with spatial ignition combustion, a lean basic mixture of air, fuel and retained exhaust gas is generally formed at partial load and auto-ignited. In the case of full load, a stoichiometric mixture is frequently formed and spark-ignited because at high loads steep rises in pressure could occur in the combustion chamber due to the auto-ignition and these would adversely affect the operation.

DE 198 10 935 C2 discloses a method for operating an internal combustion engine which operates according to the four stroke principle and in which a homogeneous lean mixture of air, fuel and retained exhaust gas is formed and is burnt after compression ignition. In this context, there is an intermediate activation phase in order to expand the operating range of the motor with compression ignition. During the compression of the retained exhaust gas, an activation fuel quantity is injected into the combustion chamber and distributed as homogeneously as possible in the combustion chamber with the remaining components of the mixture. In this way thermal energy is supplied to the mixture by power and compression so that a chemical reaction or ignition is initiated in the vicinity of the top dead center of the charge change. The ignition time of the fresh charge can be controlled during the main compression by the time and the quantity of the activation injection.

According to the current state of the art, selective control of the combustion described above can be achieved only with difficulty since the time of auto-ignition depends very greatly on the parameters of the engine and the ambient conditions. For this reason, attempts are made to control the initiation of the compression ignition using suitable control variables, for example by way of a cylinder pressure signal. Such concepts are, however, associated with a high degree of expenditure on engine control technology which leads to a rise in the manufacturing costs of such internal combustion engines.

An object of the present invention is to provide a method for operating an internal combustion engine in which reliable operation with auto-ignition is ensured.

This object has been achieved by a method in which exhaust gas is retained in the combustion chamber of an internal combustion engine and is compressed during a charge change, a first fuel quantity being injected into the retained exhaust gas by direct fuel injection. A second fuel quantity is subsequently fed to the combustion chamber, preferably during the intake phase and/or in an initial part of the compression phase, so that a homogeneous fuel/air mixture is formed in the combustion chamber. In this connection, an auto-ignition time of the fuel/air mixture which is formed from the first and second fuel quantities is set as a function of a quantity ratio of the first fuel quantity to the second fuel quantity.

The injection of the first fuel quantity into the retained exhaust gas brings about optimum homogenization or preconditioning of the first fuel quantity, which leads to an increase in mixture reactivity of the fuel/air mixture which is formed from the first and second fuel quantities. This favors the inception of the auto-ignition, in particular at operating points with a low exhaust gas temperature. The first fuel injection is preferably performed between the closing of an outlet valve and the opening of an inlet valve. Depending on the injection time of the first fuel quantity, the preconditioning effect can extend beyond pure homogenization. If, in particular, the fuel is injected into the retained exhaust gas before the top dead center of the charge change, said exhaust gas also containing residual air, conversion-like reactions can occur, as a result of which the temperature of the mixture can be influenced, in particular increased.

In a refinement of the invention, the quantity ratio of the first fuel quantity to the second fuel quantity of 1:100 to 2:1, in particular of 1:5 to 1:3, is set. As a result the preconditioning effect can be adapted to the current operating point by the first fuel quantity. The injection of the second fuel quantity preferably takes place in synchronism with induction so that the reactivity of the mixture which is set by the first fuel quantity is neither increased nor decreased. The second fuel quantity is thus primarily used to set a desired load.

According to a further refinement of the invention, a center of gravity of the combustion is set by injecting a third fuel quantity, which is carried out after the injection of the second fuel quantity ends and preferably before a top dead center of the ignition. The third fuel quantity is aimed at reducing the reactivity of the total cylinder charge in particular under high loads. This is intended to reduce high burning speeds and large pressure rises in the combustion chamber.

In a further refinement of the invention, the period of combustion is set as a function of the third fuel quantity and its injection time. With the reduction in the reactivity of the mixture which is brought about by the third fuel quantity the burning through of the cylinder charge is slowed down so that, depending on the injection time of the third fuel quantity, the combustion period can be optimized as a function of the load.

BRIEF DESCRIPTION OF THE DRAWINGS

Other objects, advantages and novel features of the present invention will become apparent from the following detailed description of the invention when considered in conjunction with the accompanying drawings.

The single FIGURE is a schematic illustration of a cylinder pressure profile of an internal combustion engine which is operated either with auto-ignition and/or spark ignition.

DETAILED DESCRIPTION OF THE DRAWINGS

An exemplary internal combustion engine with direct injection comprises at least one cylinder in which a piston is secured in a longitudinally displaceable fashion, at least one inlet valve, one outlet valve, a fuel injector and optionally an ignition source being provided per combustion chamber. The combustion chamber of the internal combustion engine is closed off at the top by a cylinder head, with the piston delimiting the combustion chamber at the bottom. The inlet and outlet valves are opened and closed by an activation device, a control unit correspondingly controlling the opening and closing times of the inlet and outlet valves in accordance with the current operating point. The internal combustion engine preferably operates according to the four-stroke principle.

In a four-stroke method, one stroke corresponds to one full stroke of the piston. According to the FIGURE shown, the profile of the combustion chamber pressure is set during one working cycle of the internal combustion engine according to the invention. The working cycle of the internal combustion engine which is composed of four strokes corresponds to one combustion cycle, a combustion cycle starting with a first intake stroke at a top dead center LOT of a charge change at which the piston moves as far as a bottom dead center UT in a downward movement. During the intake stroke, the combustion chamber is supplied with combustion air, during which process according to the invention a specific quantity of exhaust gas is retained in the combustion chamber in an expulsion stroke of a previous working cycle.

The method according to the invention is aimed at setting a specific mixture reactivity of a fuel/air mixture which is formed from the first fuel quantity and a subsequent, second fuel quantity E2 by way of a first injection E1 which is input into the combustion chamber which is filled with retained exhaust gas. In this way, closed-loop or open-loop control is carried out on the inception of the auto-ignition. This is advantageous in particular at operating points with a low exhaust gas temperature since reliable operation of the internal combustion engine with compression ignition is made possible even in lower rotational speed and load ranges.

The first fuel quantity E1 makes available a relatively large amount of energy or a relatively high temperature level for a subsequent main combustion, allowing energy loss due to the relatively small fuel quantity which is converted to be compensated when low engine loads are being implemented. As a result, the current operating range with compression ignition is increased so that further improved exhaust gas emissions can be obtained, for example in the idling mode.

The first fuel injection E1 is preferably performed between the closing of the outlet valve AS and the opening of the inlet valve EÖ. Alternatively, the first fuel quantity can be injected into the exhaust gas retained in the combustion chamber during the expulsion stroke of the internal combustion engine between the closing of the outlet valve AS and 270° Ca before a top dead center ZOT of the ignition.

Alternatively, the first fuel quantity E1 can be input into the combustion chamber in a range between the closing of the outlet valve AS and the top dead center LOT of a charge change. As a result, the conversion-like reactions during the first fuel injection E1 are increased. The injection of the first fuel quantity E1 leads to conversion-like reactions with which the final temperature of the mixture is influenced. As a result, the auto-ignition time is influenced. The first fuel quantity is preferably between 0% and 30% of the total fuel quantity, and the second fuel quantity can be between 30% and 100% of the total fuel quantity.

Inputting the second fuel quantity E2 into the combustion chamber forms the main mixture which is compressed in the compression stroke. During the compression stroke, the piston moves in an upward movement from the bottom dead center UT as far as the top dead center ZOT of the ignition. The main mixture which is formed is ignited in a region of the top dead center ZOT of the ignition by the compression which is present. According to the invention, the auto-ignition time of the fuel/air mixture which is formed from the first and second fuel quantities is set as a function of a quantity ratio E1/E2 of the first fuel quantity to the second fuel quantity. The quantity ratio E1:E2 of the first fuel quantity to the second fuel quantity is preferably between 1:100 and 2:1. A particularly advantageous preconditioning of the main mixture occurs with a quantity ratio E1:E2 between 1:20 and 2:1 or between 1:5 and 1:3. The second fuel quantity E2 is preferably injected into the combustion chamber in a range between 300° Ca and 120° Ca before the top dead center ZOT of the ignition.

While the combustion of the main mixture is still occurring, the piston expands in a downward movement as far as a bottom dead center UT. The center of gravity of the combustion can be optimized according to the invention by an injection of a third fuel quantity E3. According to the invention, the third fuel quantity E3 is input into the combustion chamber after the second fuel quantity E2 has ended. The third fuel quantity E3 is optionally injected before or after the inception of the auto-ignition, injection preferably occurring before the top dead center ZOT of the ignition so that the reactivity of the main mixture or of the total cylinder charge can be reduced or changed. The third fuel injection E3 can advantageously control the period of combustion as a function of its injection time and/or its quantity. As a result, steep rises in pressure in the combustion chamber are prevented and better exhaust gas emissions are thus obtained. The third fuel quantity E3 is preferably 0% to 30% of the total fuel quantity.

In the following expulsion cycle, the piston moves in an upward movement as far as the top dead center LOT of the charge change and expels the exhaust gases from the combustion chamber. The outlet valve is opened (AÖ) during the expulsion stroke so that the exhaust gases are expelled from the combustion chamber, with early closing of the outlet valve (AS) causing a specific quantity of exhaust gas to be retained in the combustion chamber.

According to the invention, the first fuel quantity E1 is converted in the region of the top dead center LOT of the charge change so that preconditioning or additional combustion causes the temperature of the combustion chamber to be increased. This leads to an increase in the pressure in the combustion chamber. The conversion of energy in the region of the top dead center LOT of the charge change also causes the temperature of the exhaust gas retained in the combustion chamber to be increased as a whole so that the large thermal losses of the exhaust gas against the walls of the combustion chamber, in particular in low rotational speed and load ranges, are compensated. A higher level of energy and a higher temperature are thus available for the subsequent main combustion, permitting an energy loss owing to the relatively small fuel quantity which is converted when low engine loads are implemented to be compensated. This permits reliable operation of the internal combustion engine with compression ignition even in low rotational speed and load ranges. The current operating range with compression ignition is thus made larger so that further improved exhaust gas emissions can be obtained, for example in the idling mode.

The main mixture can alternatively be spark-ignited by an ignition source as a function of the load, for example in the starting mode or in ranges with a high load, in particular at full load.

The method according to the invention permits the internal combustion engine to be operated with compression ignition essentially at all load points or in all load ranges without ignition misfires occurring. The first fuel injection E1 permits an HCCI internal combustion engine to operate at low loads, the optional, third fuel injection E3 avoiding steep rises in pressure at high loads. The increase in the temperature in the combustion chamber at the top dead center LOT of the charge change ensures that as far as possible combustion can occur with compression ignition in every combustion cycle.

It is also contemplated to omit the first fuel injection E1 and to carry out the method according to the invention with the second fuel injection E2 and the third fuel injection E3.

The invention claimed is:

1. A method for operating an internal combustion engine having a cylinder, a cylinder head in which at least one inlet valve and one outlet valve are arranged, a piston and a combustion chamber which is bounded between the cylinder head and the piston, comprising
   retaining exhaust gas in the combustion chamber and compressing the exhaust gas during a charge change,
   injecting a first fuel quantity into the retained exhaust gas by direct fuel injection, and
   subsequently feeding a second fuel quantity to the combustion chamber to form a homogeneous fuel/air mixture in the combustion chamber, wherein an auto-ignition time of the fuel/air mixture which is formed from the first and second fuel quantities is set as a function of a quantity ratio of the first fuel quantity to the second fuel quantity.

2. The method as claimed in claim 1, wherein the quantity ratio of the first fuel quantity to the second fuel quantity is set to between 1:100 and 2:1.

3. The method as darned in claim 2, wherein the quantity ratio is set one of between 1:20 and 2:1 and 1:15 and 1:3.

4. The method as claimed in claim 1, wherein a center of gravity of the combustion is set by injecting a third fuel quantity which is carried out after the second fuel quantity ends and before a top dead center of the ignition.

5. The method as claimed in claim 4, wherein the quantity ratio of the first fuel quantity to the second fuel quantity is set to between 1:100 and 2:1.

6. The method as claimed in claim 4, wherein a period of combustion is set as a function of at least one of the third fuel quantity and injection time thereof.

7. The method as claimed in claim 1, wherein the first fuel quantity is between 0% and 30% of the total fuel quantity.

8. The method as claimed in claim 1, wherein the second fuel quantity is between 40% and 100% of the total fuel quantity.

9. The method as claimed in claim 8, wherein the first fuel quantity is between 0% and 30% of the total fuel quantity.

10. The method as claimed in claim 4, wherein the third fuel quantity is between 0% and 30% of the total fuel quantity.

11. The method as claimed in claim 1, wherein the first fuel quantity is injected into the exhaust gas which is retained in the combustion chamber during the expulsion stroke of the internal combustion engine after an outlet valve closes and 270° Ca before a top dead center of the ignition.

12. The method as claimed in claim 1, wherein the first fuel quantity is input into the combustion chamber in a range between the closing of the outlet valve and a charge change dead point.

13. The method as claimed in claim 1, wherein the second fuel quantity is injected into the combustion chamber in a range between 300° Ca and 120° Ca before the top dead center of the ignition.

14. The method as claimed in claim 13, wherein the first fuel quantity is input into the combustion chamber in a range between the closing of the outlet valve and a charge change dead point.

* * * * *